United States Patent

Watson

[15] 3,687,497
[45] Aug. 29, 1972

[54] ANGULAR MOUNTING ADAPTER
[72] Inventor: Walter E. Watson, Livonia, Mich.
[73] Assignee: Link Industries, Inc., Detroit, Mich.
[22] Filed: March 5, 1971
[21] Appl. No.: 121,304

[52] U.S. Cl. ..........................287/20.3, 85/1, 85/50, 219/136
[51] Int. Cl...........B25g 3/28, B23k 9/28, F16b 9/02, F16b 17/00, F16b 43/00
[58] Field of Search .......................85/1 R, 50 R, 67; 287/189.36 F, 20 R, 20.3, 87, 12; 219/136, 130, 138

[56] References Cited

UNITED STATES PATENTS

| | | |
|---|---|---|
| 809,720 | 1/1906 | Mueller...............85/50 R UX |
| 960,899 | 6/1910 | Guyer..................85/50 R UX |
| 1,345,358 | 7/1920 | Fuller..................85/50 R UX |
| 1,412,502 | 4/1922 | Anorioli..............85/50 R UX |
| 3,145,362 | 8/1964 | Kleven................85/50 R UX |
| 3,220,289 | 11/1965 | Farekas................85/50 R X |

*Primary Examiner*—Ramon S. Britts
*Attorney*—Whittemore, Hulbert & Belknap

[57] ABSTRACT

Means for mounting a device on the apertured support comprising a pair of rings having axially tapered outer surfaces sleeved on a mounting stud of the device with their outer surfaces tapered toward one another in positions to be clamped to the support around the margins of the aperture.

1 Claim, 3 Drawing Figures

PATENTED AUG 29 1972

3,687,497

INVENTOR.
WALTER E. WATSON
BY
Whittemore, Hulbert & Belknap
ATTORNEYS

ANGULAR MOUNTING ADAPTER

BACKGROUND AND SUMMARY OF THE INVENTION

Heretofore there has not been a satisfactory universal mount for a device such as a welding cylinder. A welding cylinder should be oriented at 90° to the surface being welded. The welding cylinder ordinarily has a stud which is adapted to be mounted in the aperture of a mounting plate. One way that a proper mounting of the cylinder was accomplished in the past was to change the orientation of the mounting plate depending upon the orientation of the cylinder. This however resulted in time consuming and costly delays when changes were needed.

One object of this invention is to provide a mounting adapter which will permit the welding cylinder or other device to be readily mounted in different angular positions with respect to the mounting plate.

Another object is to provide a mounting adapter which is universal so as to adapt the welding cylinder or other device for mounting in all angular positions within a limited range.

Another object is to provide a mounting adapter comprising a pair of rings having axially tapered outer surfaces.

Another object is to provide an adapter in which the outer surfaces of the rings are frusto-conical.

Another object is to provide an adapter in which the taper of the outer surfaces of the rings is on the order of about 30°.

Other objects and features of the invention will become apparent as the description proceeds, especially when taken in conjunction with the accompanying drawing, wherein.

Figure 1:
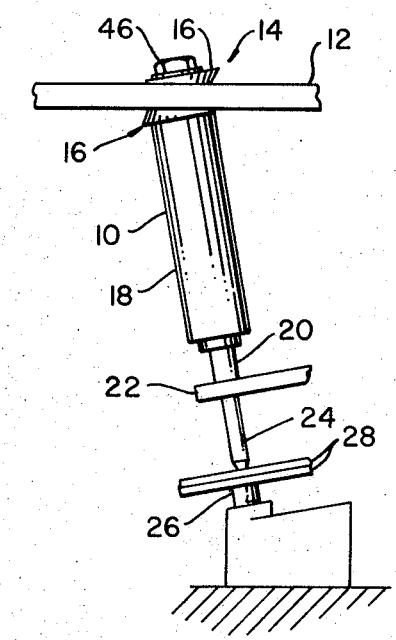
FIG. 1 is a side elevational view of a welding cylinder and associated welding apparatus shown clamped to an apertured mounting plate by means including the universal mounting adapter of my invention.

Referring now more particularly to the drawing, FIG. 1 shows a welding cylinder 10 secured to a mounting plate 12 by mounting means 14 including the adapter rings 16. It should be understood that this invention is not limited for use with welding cylinders although it is particularly well adapted for that use. The mounting means including the adapter rings as herein disclosed may be used to mount many other devices besides welding cylinders.

Referring further to FIG. 1, the welding cylinder 10 comprises an elongated cylinder member 18 having a piston (not shown) reciprocable therein and having a piston rod 20 extending from the piston through the lower end of the cylinder member. An electrode holder 22 secured to the lower end of the piston rod 20 carries an upper electrode 24. The lower electrode is designated 26 and the parts to be welded are designated 28.

It will be noted that the cylinder 10 is clamped in a position such that the cylinder and electrode 24 are disposed at right angles to the surface of the parts to be welded. This is in accordance with conventional welding practice.

The upper end of the cylinder is designated 30 and provides an abutment or shoulder at right angles to the cylinder axis, beyond which a mounting stud 32 of reduced cross section extends. The mounting stud is preferably located on the axis of the cylinder so that the upper end 30 or the cylinder is an annular surface surrounding the stud. The mounting plate 12 has a mounting hole or aperture 34 which is circular and formed at right angles to the plane of the plate. The upper circular margin of the aperture 34 is designated 35, and the lower circular margin is designated 36. The stud 32 is of much smaller diameter than the aperture 34 and is adapted to extend upwardly through the aperture.

The adapter rings 16 are in this instance of identical construction. Each ring is in the form of a centrally apertured frustum of a cone having parallel end surfaces 37 and 38 and the tapered outer surface 40. The outer surface is circular at any section taken normal to the axis of the ring. The degree of taper may vary, but preferably such taper of the surface 40 is on the order of about 30° to the central axis of the ring.

The larger end surface 38 of the ring is of somewhat larger diameter than the aperture 34, while the smaller end surface 37 of the ring is of somewhat smaller diameter than the aperture.

The upper or free end of the stud 32 is threaded, and a nut 46 is threaded thereon preferably with a lock washer 48 between the nut and the upper adapter ring 16.

Preferably the outer tapered surface 40 of each ring is knurled or serrated or otherwise roughened as indicated at 50 so as to better grip the margin of the aperture.

The central aperture 52 in each ring has its axis coinciding with the axis of the ring and its cylindrical wall is parallel to such axis and normal to the end surfaces 37 and 38. The aperture 52 is of uniform circular cross section throughout its length and of substantially larger diameter than the stud 32.

Figure 2:
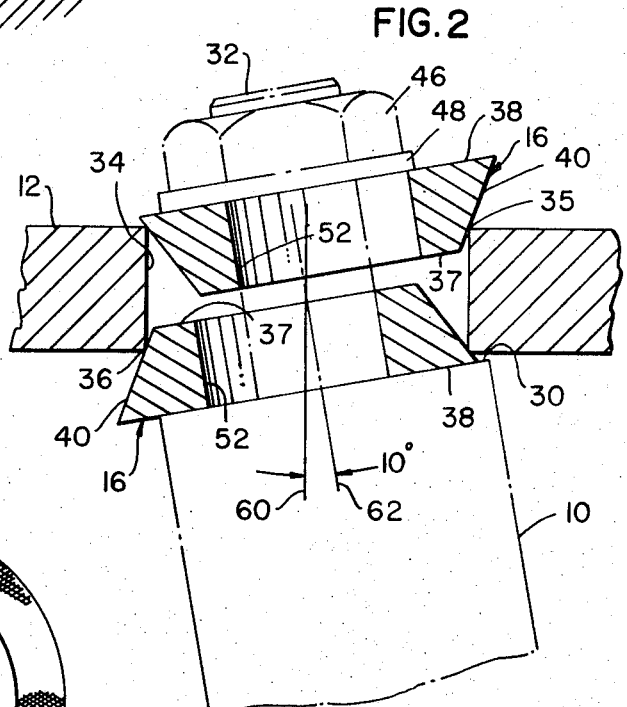
FIG. 2 is an enlarged fragmentary sectional view of a portion of Figure 1.
Figure 3:
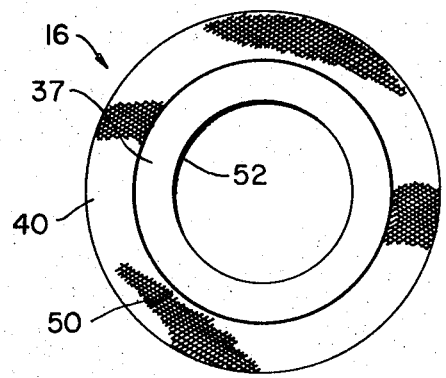
FIG. 3 is a top plan view of one of the adapter rings.

In use, the lower ring 16 is sleeved on the stud 32 so that its surface 38 rests upon the shoulder or end abutment surface 30 of the cylinder. The stud 32 of the cylinder is then extended upwardly through the aperture 34 in the mounting plate 12, and the upper ring 16 is sleeved on the stud so that its end surface 37 faces the end surface 37 of the lower ring. After applying the lock washer 48 and nut 46 to the outer end of the stud over the rings, the cylinder 10 is moved to the desired angle for welding. Thereupon the nut 46 is tightened to draw the rings 16 together into substantially 360° of engagement with the corners 35 and 36 of the mounting plate aperture 34 as seen in Figure 2. The cylinder 10 is held up tight against the lower ring 16 with its end surface 30 engaging surface 38 thereof by the tension of the nut.

The rings 16 because of their enlarged apertures 52, may shift laterally on the stud 32 prior to the application of full clamping pressure, so as to accommodate or adapt the mounting to the particular desired angle of the welding cylinder. The knurled or otherwise roughened surface 50 of the rings will bite the corners 35 and 36 of the mounting plate aperture to provide a solid mounting for the cylinder no matter what its orientation.

In FIG. 2, the reference numeral 60 designates the central axis of the aperture 34 in the mounting plate 12, and the numeral 62 designates the central axis of the stud 32 and of the cylinder 10. It will be seen that the particular mounting of my invention enables the cylinder to be clamped at an angle of as much as 10° to the mounting plate. Even greater angles may be achieved by slight modification in the taper of the surfaces 40 of the adapter rings.

What I claim as my invention is:

1. Means for mounting a device in selected positions of angular adjustment comprising a flat mounting plate, means providing a cylindrical aperture in said plate at right angles to the plane thereof, said aperture intersecting the opposite sides of said plate along circular margins at right angles thereto, a stud of substantially smaller diameter than said aperture projecting from the device through said aperture, an annular abutment surrounding said stud at the base thereof, said abutment forming a right angle with said stud and being disposed at one side of said plate, and a pair of rings having frusto-conical radially outer surfaces, the maximum diameter of said frusto-conical surfaces of said rings being greater than the diameter of said aperture and the minimum diameter of said frusto-conical surfaces being less than the diameter of said aperture, said rings being sleeved on said stud with their frusto-conical surfaces tapering toward one another and respectively partially entering said aperture from opposite sides of said plate, and a nut threaded on said stud at the side of said plate opposite the side at which said abutment is disposed, said nut bearing upon the adjacent one of said rings to draw said abutment into bearing relation with the other of said rings so as to urge said rings toward one another for firm clamping engagement of their frusto-conical surfaces with the margins of said aperture throughout substantially 360° and thereby clamp the device to said plate, the radially inner surfaces of said rings being of substantially greater diameter than said stud to permit lateral movement of said rings relative to said stud and the clamping of the device to said plate in selected positions of angular adjustment relative thereto.

* * * * *